Sept. 17, 1957     A. A. ANDERSON     2,806,766
PROCESS OF PURIFYING CAUSTIC ALUMINATE LIQUORS
Filed Nov. 28, 1952
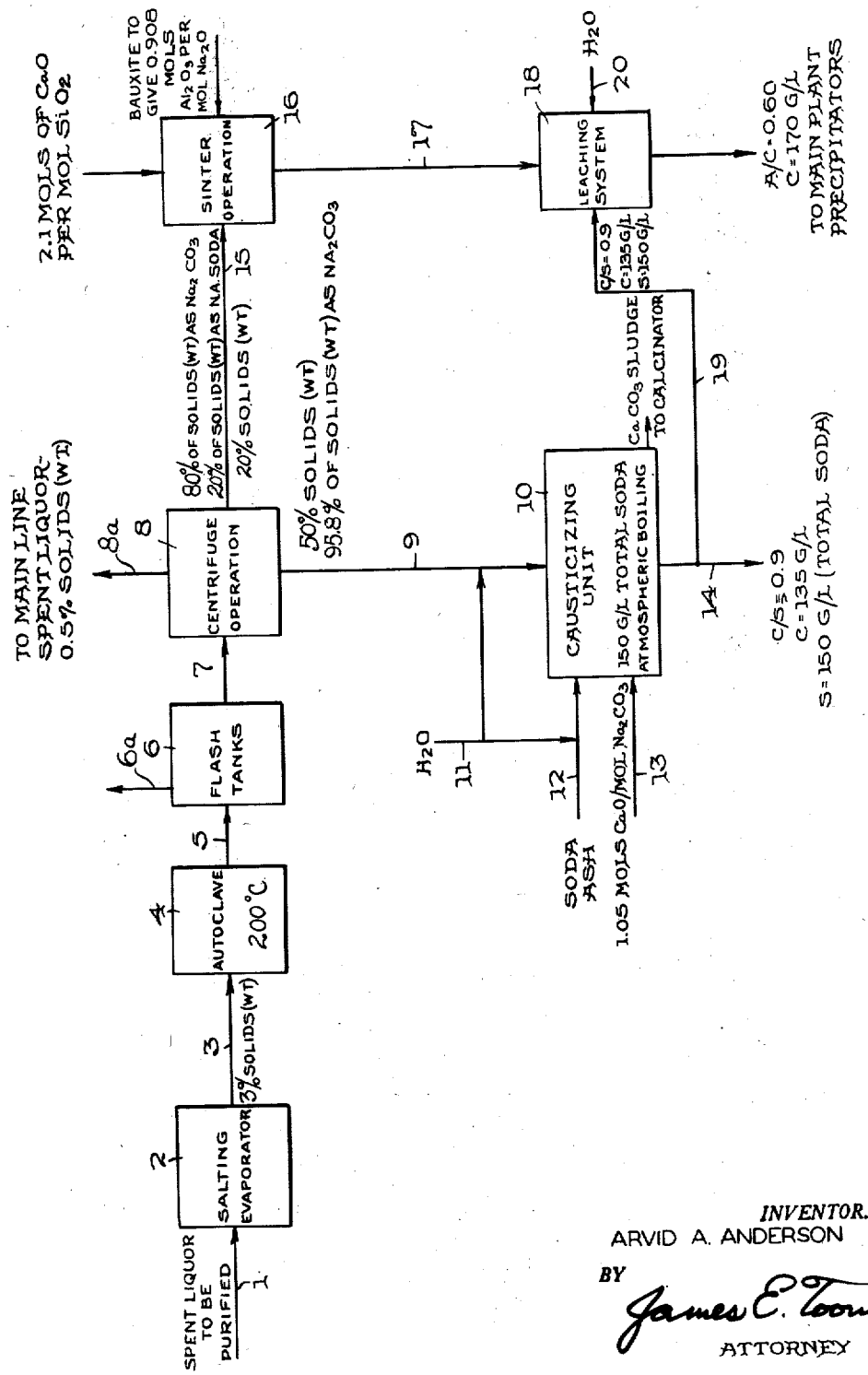
INVENTOR.
ARVID A. ANDERSON
BY
James E. Toomey
ATTORNEY

United States Patent Office 2,806,766
Patented Sept. 17, 1957

2,806,766

PROCESS OF PURIFYING CAUSTIC ALUMINATE LIQUORS

Arvid A. Anderson, Baton Rouge, La., assignor to Kaiser Aluminum & Chemical Corp., Oakland, Calif., a corporation of Delaware Application November 28, 1952, Serial No. 323,108

8 Claims. (Cl. 23—143)

The present invention relates to a process for the treatment of caustic aluminate liquors such as are used in the production of alumina from aluminous ores by the well-known Bayer process. More particularly, the invention relates to a process for the purification of contaminated Bayer process liquors to establish and/or maintain improved conditions for clarification of the liquor containing the residue of the digested ore and for the precipitation of the alumina from the clarified liquor. Specifically, the invention is directed to a process which accomplishes the removal and degradation, destruction or alteration or organic substances in the liquors, which act as settling inhibitors during clarification and which also adversely affect precipitation of alumina from the clarified liquor. The process further provides a means for control of process carbonation by rectification of non-caustic soda into caustic soda for reuse in the Bayer process. This application is a continuation-in-part of the copending application Serial No. 262,808, filed December 21, 1951 and my copending application Serial No. 309,244, filed September 12, 1952, the latter now abandoned.

The well known Bayer process is universally operated on a continuous basis and involves pressure digestion of aluminous ores, such as bauxites and laterites, in caustic aluminate liquor of varying caustic soda concentration and at elevated temperatures depending upon the type of ore to extract the available alumina. The caustic liquor enriched in sodium aluminate is then subjected to clarification by settling, washing, and filtering to remove the so-called red mud residue of the ore which consists primarily of hydrated ferric oxide and a desilication product. Alumina is then auto-precipitated from the clarified green liquor by decomposition of sodium aluminate through seeding with previously precipitated alumina and the spent caustic liquor is recycled to the digestion phase, usually after reconcentration and addition of required amounts of make-up caustic liquor.

STATEMENT OF PROBLEM

It is recognized that the circulating caustic aluminate liquor of the Bayer process is much more complex than a mere solution of sodium aluminate and excess caustic soda. The liquor also contains relatively large quantities of dissolved sodium carbonate and smaller quantities of a complex mixture of solubilized or dissolved sodium organic substances, such as sodium organic compounds including salts, which are formed in the caustic liquor from the organic matter, such as humus, present in the ore, and from the starch which is generally employed as a flocculating agent in settling the red mud residue of the ore by the usual countercurrent decantation operation. This organic matter combined with a portion of the soda ($Na_2O$) imparts the typical dark color to the recycled liquor.

Thus, the circulating liquor is progressively contaminated with these organic substances or sodium organic compounds (designated collectively as sodium organates) and also sodium carbonate, the latter representing the so-called process carbonation of the liquor, a term used generally throughout the industry. Process carbonation involves the accumulation of sodium carbonate in the liquor through (1) the progressive degradation of sodium organic compounds of more or less higher molecular weight into this more or less ultimate form, (2) pick up of carbon dioxide from the atmosphere by the caustic soda, and (3) introduction of soda ash as such into the process liquor from the lime-soda causticizing reaction when conducted outside or inside the main liquor system.

This contaminating fraction of the total sodium ($Na+$) or soda ($Na_2O$) content of the liquor is denominated herein as the "non-caustic soda," since it is not present as free caustic soda and is not available to form sodium aluminate. The fraction of the non-caustic soda which includes the organic substances or sodium organates is designated herein as "non-alkaline soda," since its comprises sodium compounds which are not acid titratable. The balance of the non-caustic soda is sodium carbonate. Thus, non-caustic soda = non-alkaline soda (sodium organates) + $Na_2CO_3$.

The process carbonation in the liquor must be controlled to prevent excess accumulation of sodium carbonate which serves no useful purpose and represents an inventory of causticizable soda which must be utilized. Moreover, it is recognized that sodium carbonate interferes with auto-precipitation of alumina from the clarified liquor, probably through some effect on the decomposition reaction or solubility of alumina. In addition, sodium carbonate reduces to some extent the settling rate of the red mud in the clarification phase of the process.

The non-alkaline soda (sodium organates) constitutes a minor fraction of the non-caustic soda in the contaminated process liquor. Nevertheless, it gives rise to a most serious problem in that at least a portion thereof exerts a powerful inhibiting action on the settling of the red mud or ore residue during clarification of the liquor. In addition, it has previously been recognized that organic matter in the liquor inhibits auto-precipitation of alumina from sodium aluminate liquors. This adverse effect on the settling rate of the red mud in the increasingly contaminated liquor is reflected in actual practice by an increased starch consumption, based on the amount or weight of red mud which can settled at any given rate. However, increasing starch feed rate aggravates the problem by increasing the net concentration of organic matter as sodium organates (non-alkaline soda) in the liquor, since the starch degradation products, as well as sodium organic compounds from the organic matter in the ore, include potent settling inhibitors. This cumulative effect is also reflected by further inhibition of the auto-precipitation rate.

A substantial control of process carbonation in the Bayer process is afforded by so-called inside causticizing wherein the lime-soda reaction to produce the required caustic soda is conducted in the main process liquor stream in the digesters. A certain quantity of the lime charged is used to causticize a substantial portion of the sodium carbonate formed by process carbonation. Thus, a desired low level of sodium carbonate is maintained in the recycled liquor. Inside causticizing, however, cannot function to substantially reduce the non-alkaline soda concentration, since it removes only small amounts of the sodium organates, perhaps as insoluble calcium compounds. Accordingly, the level of non-alkaline soda, i. e., sodium organate contamination, is substantially uncontrolled. This factor left uncontrolled may not seriously interfere with the Bayer process as practiced on a high grade trihydrate alumina ore, although a definite benefit in starch efficiency and precipitation rate would be realized should some control means be made available.

Of perhaps greater significance is the fact that inside causticizing is of definitely limited application. This procedure can only be efficiently utilized where the ore being extracted contains substantially all of its alumina as the relatively highly soluble trihydrate whereby the caustic soda concentration of the liquor may be maintained correspondingly low (e. g. 180 grams per liter NaOH as equivalent $Na_2CO_3$).

In the production of alumina from ores of lower grade which contain a portion of the alumina as monohydrate, and particularly from ores of the European type wherein all of the alumina is in the form of the less soluble monohydrate, the concentration of caustic soda in the liquor must be substantially higher than when extracting an all trihydrate alumina ore. As a consequence, inside causticizing cannot be practiced since the relatively high caustic soda concentration of the liquor severely reduces the efficiency or degree of completion of the lime-soda reaction. Accordingly, some means other than lime causticizing must be adopted to control process carbonation and maintain the sodium carbonate concentration at a sufficiently low level when processing lower grade or monohydrate ores. In one of its more important aspects, the present invention is directed to a particular manner of effective control of process carbonation and recovery of the sodium carbonate as caustic soda while concurrently substantially freeing the liquor of settling inhibiting sodium organates.

Of vital importance in the necessary production of alumina from the lower grade aluminous ores, is the effect of the settling inhibitor portion of the non-alkaline soda (sodium organates). Most of the lower grade ores, such as the West Indian bauxites and laterites, contain large fractions of mud residue (hydrated ferric oxide) of a highly dispersible, slow or substantially non-settling nature. Moreover, these lower grade ores contain higher amounts of organic matter, such as humates and the like, than the high grade trihydrate ores. Thus, the non-alkaline soda concentration of the circulating process liquor builds up to a higher lever. This combination of factors actually leads to the result that no practical settling rate for the red mud can be obtained without utilization of excessive quantities of starch. As indicated above, excessive starch consumption increases the concentration of non-alkaline soda, including settling inhibiting sodium organates, in the recycled liquor through degradation of the starch and the net effect after repeated recycling of the liquor is negative on the red mud settling rate and a further inhibition of the auto-precipitation reaction. Accordingly, efficient processing of lower grade aluminous ores by the Bayer process without control of the deleterious sodium organates (non-alkaline soda) is not attainable.

The invention is accordingly directed in its most important aspect to offsetting these adverse effects of the organic substances in the non-alkaline soda while concurrently providing a control of process carbonation and a recovery of the soda ($Na_2O$) as caustic soda.

OBJECTS

It is, therefore, a primary object and purpose of the invention to provide an improved process for the treatment of contaminated caustic aluminate liquors whereby the deleterious effect of the non-alkaline soda fraction (sodium organates) is offset, and control of process carbonation is effected, and the non-caustic soda of the liquor is rectified to caustic soda.

A further object is to provide an improved purification process for establishing and/or maintaining improved conditions for clarification of Bayer process liquors containing the residue of the digested ore and for precipitation of alumina from such clarified liquors.

A more specific object of the invention is to provide an improved treatment for alkali aluminate liquors whereby the Bayer process is rendered amenable to production of alumina from lower grade aluminous ores containing relatively large amounts of highly dispersible, difficultly settling residues.

A specific object of the invention is to provide an improved process for removal and separation of a substantial portion of the sodium carbonate in the circulating caustic aluminate liquor, and for removal by separation and/or degradation into innocuous substances, of the non-alkaline soda of the liquor, which inhibits settling and auto-precipitation.

A further specific object of the invention is to provide an improved process for purifying contaminated caustic aluminate liquors to improve settling rates of the red mud residue and to reduce starch consumption in the clarification phase.

These and other objects and advantages of the invention will become apparent from the following detailed description thereof.

LIQUOR PURIFICATION

The invention in its most generic aspect embraces the treatment of caustic aluminate liquors, containing organic matter, believed to be sodium organic compounds (sodium organates), which inhibit settling of the ore residues, comprising concentrating the liquor to obtain a precipitated sludge of sodium organates, pressures digesting, that is, heating the sludge-containing liquor without evaporation above its atmospheric boiling point, and thereafter separating the resulting sludge from the liquor. The sludge obtained prior to pressure digestion is a gelatinous slimy precipitate, the identity of which is unmistakable so that it suffices to state that the liquor should be concentrated sufficiently to obtain this type of precipitate.

It has been found that pressure digestion of the precipitated sludge in the concentrated liquor prior to separation therefrom, materially contributes to the increased red mud ore residue settling rates when the purified liquor is employed for digestion of further quantities of ore in the cyclic process. The degree of heating may be widely varied, but in general the higher the temperature to which the sludge is heated, the greater the improvement in red mud settling rates.

The separation of the precipitated sludge from the concentrated liquor subsequent to the intermediate heating step is critical to substantially complete realization of the objective of removal of the insolubilized organic matter including organic settling inhibitor compounds and their degradation products, and consequent increase in the red mud settling rate and starch effectiveness.

In this regard, the pressure digestion of the sludge materially changes the nature of at least a substantial portion of the slimy gelatinous precipitate formed on concentrating the contaminated caustic liquor. The relatively high temperatures involved in pressure digestion apparently cause a more advanced molecular degradation of that fraction of the sludge characterized as gelatinous and which renders filtration at practical and adequate rates on a commercial scale unattainable or uneconomical.

An important advantage of the invention lies in the fact that the pressure digestion so modifies the sludge, it is rendered filterable at highly acceptable rates. Separation by filtration, in turn, as a preferred embodiment, provides a means by which the liquor may be more highly purified with a further increase in the gain in red mud settling rates. However, the invention is not limited to filtration as the unit separatory operation, since centrifuging of the sludge from the liquor, as disclosed in the copending application S. N. 262,808, above-referred to, is preferred where it is desired to classify the sludge into its causticizable and non-causticizable components for subsequent direct lime causticizing and sinter-leach soda recovery operations, respectively. Moreover, other suitable separatory means effective to recover the sludge solids from the major portion of the liquor are embraced within this invention.

In referring to liquor purification by the present invention it is to be understood that the step of concentrating, followed by superheating the sludge-containing liquor, accomplishes a decontamination or purification beyond a reduction in existing settling inhibitor content by precipitation and subsequent removal of a substantial portion of the non-alkaline soda from the liquor. The initial concentration step producing an increase in caustic soda concentration and the heating attendant therewith apparently contributes to a degradation, destruction or alteration of the organic substances acting as settling inhibitors whereby relatively innocuous decomposition products are evidently formed, some of which are insoluble in the concentrated liquor and constitute a portion of the sludge, while others comprise a part of the soluble non-alkaline soda retained in the liquor.

The thermal degradation or decomposition of some of the settling inhibitor content of the non-alkaline soda is apparently materially advanced above and beyond the effects of mere concentration by the pressure digestion of the sludge in the concentrated liquor prior to separation. The effect of this intermediate heating step may not always be reflected in an increase in the total amount of non-alkaline soda (sodium organates) in the sludge precipitated from the liquor, since it apparently tends to cause further formation of lower molecular weight sodium organic compounds (and to some extent sodium carbonate) which are soluble in small amount to the extent of saturation or supersaturation in the highly concentrated caustic liquor, but are relatively innocuous in respect to settling of the ore residues and starch efficiency.

It is not intended, however, to limit the process to any particular mechanism or theory of action, and it suffices to state that the concentration of the contaminated liquor followed by pressure digestion of the sludge in the liquor with subsequent separation of the digested sludge effectively frees the liquor of the sodium organic compounds of the non-alkaline soda fraction which act as settling and precipitation inhibitors as evidenced by improved red mud settling rates, starch effectiveness and alumina precipitation.

The concentration of the liquor to obtain the non-alkaline soda precipitates also results in a salting out or crystallization of a substantial portion of the sodium carbonate fraction of the non-caustic soda in the circulating liquor treated, since the solubility of the carbonate decreases with increasing caustic concentration. Thus, the purification of the liquor also provides a direct means of controlling process carbonation thereby reducing the carbonate soda concentration in the circulating liquor and maintaining a desirably high ratio of caustic soda to total soda (C/S = ratio of caustic soda, C, as free NaOH and as combined in the form of sodium aluminate, and total soda, S, as caustic soda plus carbonate soda) in the process liquor. In employing the intermediate heating step of the present invention, it is advantageous regarding maximum removal of sodium organic salts and sodium carbonate to permit the heated sludge-containing liquor to cool at least to the atmospheric boiling point prior to separation of the sludge, the solubility of the sodium salts decreasing with decreasing temperature.

Accordingly, the present invention advantageously provides for improvement in the quality or purity of the process liquor. Improved quality or purity of the liquor, as used herein, is intended to mean that the liquor after treatment contains less non-caustic soda, particularly the sodium carbonate fraction; less non-alkaline soda; and reduced concentration up to the point of substantial freedom of sodium organic compounds which are settling inhibitors and which adversely affect the effectiveness of starch in settling the red mud residue of the ore. The liquor purification process, as above described, is beneficial to a variable degree in any case of alumina production by the wet alkali aluminate method depending upon the impurity level in the liquor; but is vital and necessary to the operativeness of the Bayer method applied to certain types of bauxites and laterites, such as West Indian ores, if the red mud residues are to be settled from the process liquor in a practical and successful manner. Thus, the invention provides a means for establishing and maintaining a Bayer liquor of such purity that red mud residues from these types of ores may be settled by the use of a practical and necessarily limited amount of starch, which ore residues could not otherwise be processed at all.

In the application of the process in actual commercial practice the size or capacity of the purification operation is based on that required to rectify the non-caustic soda formed and/or introduced into the circulating process liquor per cycle and the existing level of such impurities in the liquor, if any. The amount of non-caustic soda (sodium carbonate and sodium organates) existing and formed may be determined by appropriate liquor analysis and for any given liquor depends on many factors including (1) the nature of the bauxite particularly the organic matter content, (2) the contribution of the starch in formation of sodium organates, (3) the sodium carbonate introduced with the causticizer effluent, and (4) other net process carbonation including carbonate soda formed from the organic matter of the ore and starch. Accordingly the fraction of the process liquor to be treated per cycle is widely variable since it depends on the level of non-caustic impurities and the amount of formation thereof per cycle, including both settling inhibiting organic compounds and sodium carbonate.

Moreover, the fraction cut out to purification must also be determined with reference to the amount of non-caustic soda precipitated as sludge, which in turn is dependent on the level or concentration of the non-caustic impurities in the liquor being treated, the degree to which the caustic liquor is concentrated, and the degree of separation of the sludge or clarification of the treated liquor.

Finally, the requisite degree of purification of the circulating liquor varies depending upon relative difficulty of settling the red mud residues of different aluminous ores, that is, for a given starch consumption certain residues will settle at practical and adequate rates at permissibly higher levels of liquor impurities.

Therefore, the specific and optimum operating conditions must necessarily be determined empirically for each particular case and such determination may readily be accomplished from liquor analyses, and observation of the degree of improvement in ore residue settling rates at a desirably low starch feed rate.

It may be stated, however, that in general the concentration of the liquor should proceed to at least 350 grams per liter caustic soda (as equivalent $Na_2CO_3$) when confronted with non-caustic soda in what may be termed normal amounts, although as indicated above, the particular caustic soda concentration at which the gelatinous precipitate is obtained varies necessarily with the level or concentration of the non-alkaline soda impurities in the liquor (and to some extent with the varying specific composition of these impurities which is relatively unknown and indeterminable). The amounts of both the slimy gelatinous precipitate of the complex mixture of sodium organic compounds and the more or less crystalline sodium carbonate precipitate may be increased by increasing the caustic soda concentration up to about 600 grams per liter. However, the density of the viscous caustic liquor is increased at such high concentrations and tends to increase the difficulty in separation of the sludge therefrom. This is important in determining optimum concentration since maximum clarification of the treated liquor is an essential objective in practicing the purification process. In regard to specific conditions of the liquors investigated, it was found that caustic soda-concentrations of from about 380 to about 500 grams per liter were most advantageous.

Regarding the intermediate heating performed on the previously concentrated sludge-containing liquor, it should be understood that the principal object of the heating step is to obtain further increase in red mud settling rates by apparent degradation of the organic contaminants and accordingly temperatures higher than the atmospheric boiling point of the solution are critical to the substantial full realization of the discovery. Thus, temperatures above the atmospheric boiling point are necessary and to a large extent the results obtained improve as the temperature is increased. However, the advantageous results are more economically realized by utilizing a preferred temperature range of from about 150° C. to 250° C. (about 300 to about 480° F.), thus permitting use of autoclaves of conventional design. In general, the length of time at which the sludge containing liquor is held at a particular temperature is not critical to the realization of an improvement although experimental results indicate the advisability of residence times of at least about 20 minutes. However, the results definitely favor longer residence times for better settling rates.

In any event, it suffices to heat the previously concentrated sludge-containing liquor above the atmospheric boiling point under pressure until the ore residue settling inhibiting characteristics of the liquor subsequent to separation of the sludge are substantially further reduced, or conversely the starch efficiency is further increased.

In general, it is most practical to cool the liquor after the intermediate heating to the atmospheric boiling temperature. This may readily be accomplished by flash cooling upon reduction of the steam pressure to atmospheric. This necessarily results in further concentration of the liquor and an obtainment of the beneficial results therefrom, and in some instances permits a lower degree of initial concentration. Thus, the heated sludge containing liquor is usually cooled at least to the atmospheric boiling point, but may, of course, be further cooled to induce further precipitation.

The sludge precipitated by the concentration, and subjected to the intermediate heating with the liquor, is then effectively separated from the caustic liquor, preferably by filtration, or as a slurry containing as high as about 50 to 60% solids content with the clarified liquor containing only about 0.5% solids when utilizing the centrifuging operation as the means of separation.

ALTERNATIVE PROCEDURES

In the operation of the process of the invention, it has been found that in general an increase in liquor purity is obtained with the following process variations:

(1) Conducting the liquor concentration by a batch type operation which is slower than the continuous type of salting evaporation generally contemplated in the foregoing description.

(2) Holding the concentrated and heat treated sludge-containing liquor prior to sludge separation for a period sufficient to approach equilibrium conditions between the compounds in the precipitated sludge and their dissolved counterparts. This constitutes a means of obtaining the advantageous result of the conditions under (1) above while operating on at least a semi-continuous basis. The holding also permits further cooling of the sludge-containing liquor.

(3) Additions of very small but effective amounts of lime in any suitable form to the concentrated liquor containing the sludge before or after the intermediate heating, and either with or without a significant holding period before separation of the sludge.

The invention as to one specific embodiment is described in detail below in connection with the flowsheet of the drawings, but without limitation thereto. Certain terms or symbols referring primarily to liquor composition are employed below and in the drawings and accordingly are hereby defined as follows:

The liquor composition in terms of alumina, caustic soda and total soda may be determined by analysis. Thus, C=Caustic soda, that is, free NaOH as determined by titration to sodium hydroxide end point plus the NaOH combined with alumina.
S=Total soda, that is, caustic soda plus soda as $Na_2CO_3$ (total acid titratable soda) as determined by titration to total alkalinity end point.
A=Alumina as determined by precipitation as $$Al_2O_3 \cdot 3H_2O$$

by neutralization and subsequent calcination.

In the specification and appended claims the concentrations are indicated in grams per liter. Caustic soda (NaOH) is in all cases expressed as equivalent $Na_2CO_3$.

The effect of heat treatment on the removal of the deleterious non-caustic and non-alkaline soda compounds is apparent from a consideration of the experimental data presented in Table I. The untreated sample was merely concentrated to 442 grams per liter, the solids removed by centrifugal separation and thereafter the settling properties of the clarified liquor determined. The heat treated sample was concentrated and then subjected to a temperature of 195° C. for 2 hours before flashing to atmospheric pressure whereafter the solids were removed by centrifugal force and the settling properties of the clarified liquor determined.

*Table 1*

|  | Untreated | Heat Treated |
|---|---|---|
| Analysis of Clarified Liquor (gr./l.) |  |  |
| A | 133 | 141 |
| C | 442 | 472 |
| S | 520 | 537 |
| A/C | .304 | .298 |
| C/S | .848 | .897 |
| Volume Percent Solid Components: |  |  |
| Non-Caustic Compounds | 25.5 | 35.0 |
| Non-Alkaline Compounds | 8.0 | 0 |
| Settling Rate (ft./hr.) | 3.9 | 5.9 |

From a consideration of the volume percent of solid non-alkaline compounds of the sludges of the untreated and heat treated liquors, it is apparent that substantial degradation of the higher molecular weight non-alkaline compounds has taken place into the more or less ultimate form of sodium carbonate in the case of the heat treated sample. Thus in the untreated liquor 8% of the volume immediately prior to clarification contained the gelatinous slimy precipitates of the non-alkaline salts whereas the heat treated sample contained substantially no slimy precipitates of the settling inhibitor containing non-alkaline fraction. The beneficial effect of the treatment on the settling properties of the heat treated liquor is moreover apparent by the substantial increase in settling rate from 3.9 to 5.9 feet per hour.

SETTLING TESTS

The untreated liquor and the clarified heat treated liquor where employed in tests to determine settling rates which involved an actual digest of bauxite in each liquor in order to reproduce as nearly as possible the red mud settling conditions encountered in one type of a Bayer system.

*Digestion.*—An amount of purified liquor to give the equivalent of 175 grams of caustic soda (as equivalent $Na_2CO_3$) was placed in a stainless steel batch digester. 61 grams of a Jamaican bauxite having a particularly large red mud residue content of highly dispersible nature was then added. From the liquor analysis and the known amount of available alumina in the bauxite, an additional amount of alumina hydrate was calculated and added to produce a charging ratio of alumina to caustic (A/C) of .50 in the digester effluent. Water was then added to bring the caustic concentration to 234 grams per liter.

The digester was purged of air by sweeping with $N_2$ and the ore charge was digested for 30 minutes at 190° C., the heat being supplied by a high pressure steam jacket. The digested slurry was then cooled to less than 100° C. by passing water through the jacket.

After cooling 49 grams of a Surnam bauxite was added together with 200 ml. of water. The digester was again purged of air by sweeping with $N_2$ and the slurry digested for 20 minutes at 150° C.

After this second digest the contents were then flashed to atmospheric pressure.

Settling rates.—The hot slurry was drained into a stainless steel beaker and the volume adjusted to 975 ml. to give a caustic soda (C) concentration of 180 g./l. The slurry was maintained at its atmospheric boiling point and presolubilized starch in amount of 0.5% based on the weight of red mud was added and the slurry was stirred for two minutes. The starch solution was prepared as follows:

5 grams of Maine potato starch was heated to 100° C. for 25 minutes in 200 ml. of a 2.5% (by weight) NaOH solution. The solution was cooled and adjusted to a starch concentration of 20 g./l. 7.5 ml. of the starch solution was added to the digested slurry. Of the 110 grams of bauxite charged, about 30 grams remain as mud residue. The 7.5 ml. of starch at 20 g./l. is equivalent to 0.5% of the 30 grams of red mud.

The starch containing slurry was placed in a 1000 ml. graduate provided with a picket type rake, the rake extending upward from the bottom to about one-half to the depth of the graduate, and maintained in motion from a centrally disposed rake shaft. (To simulate the rakes of the Bayer plant clarifiers.)

The slurry was settled with the rake revolving at one R. P. M. By observation of the time for the mud to settle between given points on the graduate, the settling rate in feet/hour was calculated in known manner. The rate observed is the rate during constant settling. The same digestion and settling rate procedures were used for both samples.

As previously mentioned, the ability to filter the sludge is an important advantage resulting from the heat treatment of the invention. Moreover, greater purification of the clarified liquors is obtained when they are filtered than when centrifugally clarified due to more efficient removal of sludge solids. For example, whereas normally red mud settling rates of 3 to 4 feet per hour are obtained for concentrated liquors which have been clarified without the herein described heat treatment process, and it is extremely difficult to separate the sludge by filtration on a large scale, settling rates two to three times as fast have been obtained with liquors heat treated prior to separation by filtration, and acceptable filtration rates have been obtained. The following examples serve to illustrate increased sludge filtration rates and red mud settling rates.

EXAMPLE I

A test tank spent liquor was concentrated to about 450 grams per liter caustic soda and thereafter the sludge containing organic salts was subjected to heat treatment at 200° C. for 20 minutes in a pressure digester or autoclave, and after flashing, clarified by pressure filtration. The filtrate was then utilized as a digesting liquor in the previously described type of settling test and a settling rate of 11.6 feet per hour was obtained. Moreover, the slurry was readily filterable at a filtration rate of 20 gallons per square foot per hour.

EXAMPLE II

With still another contaminated liquor, which was concentrated to about 450 grams per liter, heat treated at 200° C. for 20 minutes, and thereafter filtered, a filtration rate of 7.3 gallons per square foot per hour was obtained. The clarified liquor as digestion medium for aluminous ore produced a red mud settling rate of 6.3 feet per hour.

EXAMPLE III

In a case where lime was added to aid filtration and clarification, a filtration rate of 60 gallons per sq. ft. per hour and settling rate of 7.4 feet per hour was obtained. In this case a contaminated liquor was concentrated to about 450 grams per liter caustic soda, slaked lime added in an amount of 7.7 grams of lime per liter of solution, the solution heat treated at 200° C. for 20 minutes and thereafter clarified by filtration.

The advantageous results of the herein described invention are apparent whether the separation of the sludge is by filtration or by centrifugal means. For the purpose of recovering the soda content of the precipitated sludge, centrifuging for clarification has the added advantage of presenting a method of separating the salts from the mother liquor and at the same time, by proper operation, classification of the causticizable from the non-causticizable salts, as disclosed in copending application S. N. 262,808. Accordingly, centrifuging affords an alternative method of separation, permitting utilization of the less expensive direct lime causticizing reaction for recovery of soda from the sodium carbonate fraction of the precipitated sludge, as opposed to the more expensive sinter-leach process necessary for soda recovery where there is no fractionation of the precipitated sludge.

SINTER AND CAUSTICIZING OPERATIONS

The liquor purification method of the invention may advantageously be combined with steps for recovery of substantially all of the soda and alumina removed from the liquor during purification.

The sludge precipitated by concentration, followed by heating, is separated by centrifuging into a high solids slurry and the slurry mixed with alumina-containing material, or in the case where the separation is by filtration the cake is mixed with such aluminous material, and the mixture subjected to a sintering operation at appropriate temperatures, for example, 1000 to 1200° C., preferably 1050–1150 (or about 1900 to 2100° F.) to destroy the organic matter, thus decomposing the sodium organates and also the sodium carbonate to form sodium aluminate with the alumina in the bauxite and some excess soda. Lime in proper amounts is added to minimize reaction of soda and alumina with the silica in the ore and subsequent loss in silicate form. The sintered product is leached with diluted caustic soda solution (e. g. diluted causticizer effluent, spent liquor, or hydrate wash liquor) and the leach liquor obtained corresponds to a green caustic aluminate liquor ready for precipitation, most of the alumina in the mother liquor of the sludge being recovered and the soda being recovered as sodium aluminate, and as the excess soda which increases the caustic concentration of the leach liquor.

The alumina-containing material may be a fresh ore, such as bauxite, or advantageously may be the red mud residues from the digestion of a high silica bauxite (usually above 6% $SiO_2$). Other high silica-containing aluminous ores, including clays, may be utilized in the sinter process for the recovery of the alumina as sodium aluminate, whereas such materials are not amenable to direct processing for alumina extraction by the Bayer process. Accordingly, the term alumina-containing material includes fresh aluminous ores, and ore residues having a significantly high alumina content, or mixtures thereof. In such case, the filter cake, or high solids slurry from centrifugal separation, is mixed with the red mud residues from a previously digested bauxite of high silica content together with appropriate amounts of lime for combination with the silica. Fresh soda ash may also be fed to the sinter operation where the amount of soda in the precipitated sludge is not sufficient, or fresh aluminous ore may be added to balance the soda content of the ore residue and the sludge. The mass is then sintered according to the conditions above-mentioned. The leach of the sinter product in such cases as this, is normally conducted with a dilute caustic solution usually of about 100–150 grams per liter and the sodium aluminate leach liquor sent to the precipitation phase of the main Bayer process. Alternatively, should the silica content of the leach liquor be excessive, the leach liquor may be returned to the digestion phase of the Bayer process for the purposes of desilication of the liquor. Thereafter, the liquor as combined with the main plant pregnant liquor stream is processed for recovery of the contained alumina.

As an alternative to the sinter process for soda recovery performed on the entire sludge, a fractional centrifuging of the precipitated sludge may be accomplished in cases where substantial quantities of non-alkaline salts remain after the intermediate heat treatment to give (1) A high solids slurry of 50–60% solids by weight rich in sodium carbonate and relatively low in concentrated caustic mother liquor containing alumina, and low in the slimy gelatinous precipitate of sodium organates.

(2) A low solids slurry 15 to 30% by weight, relatively lean in sodium carbonate and high in non-alkaline soda sludge and mother liquor containing alumina. The carbonate rich-low alumina and non-alkaline soda slurry is adaptable to direct causticizing to rectify the sodium carbonate to caustic soda. It contains a minimum of non-alkaline soda, which under ordinary lime causticizing conditions is not causticizable. Moreover, it is important to reduce the alumina and caustic soda content in this causticizer feed since most of the alumina would be lost as insoluble calcium aluminate which goes out with the lime sludge ($CaCO_3$) formed and the caustic soda would reduce efficiency of the lime-soda reaction. As a further means of lowering the alumina and caustic soda concentrations of the causticizer feed, it is recommended that the carbonate rich slurry be only a fraction of the total feed, using fresh soda ash solution as the balance.

The carbonate lean slurry, high in alumina containing mother liquor and high in non-alkaline soda sludge advantageously constitutes a reduced load for the sinter operation and permits reduction in capacity of equipment required.

The overall process is more fully described in conjunction with the following example with reference to the accompanying drawing.

Referring to the figure, there is shown a schematic flow diagram of the improved process of the invention illustrating the purification process wherein spent liquor is concentrated, the concentrated sludge-containing liquor is heated, and the precipitated sludge is separated from the cooled concentrated liquor by centrifuging with subsequent treatment of sludge fractions to rectify the soda ($Na_2O$) and to recover the same as caustic soda (NaOH and sodium aluminate), while also recovering the alumina in the liquor associated with the sludge.

A selected fraction of contaminated spent liquor to be purified is introduced through line 1 into a salting type evaporator 2 wherein the liquor is concentrated to obtain a slimy gelatinous precipitate of a portion of the non-alkaline soda or sodium organates and a precipitate of sodium carbonate.

The effluent liquor from salting evaporator 2 is passed through line 3 to an autoclave 4 in which the sludge-containing liquor is heated at 200° C. for a period upwards to 2 hours. The heated slurry is passed through line 5 to flash tanks 6 where it is cooled to the atmospheric boiling point, the steam leaving the flash system through line 6–a, and then the cooled slurry is passed through line 7 to the centrifuging operation indicated at 8 where the sludge is concentrated and separated from the liquor to produce a highly clarified liquor containing about 0.5% solids by weight which is recycled to the mainline spent liquor through line 8–a. The thickened sludge is separated by the centrifuging operation into two fractions as separate centrifuging underflows. One fraction of a high solids content, namely about 50% solids by weight containing 95.8% of its solids as sodium carbonate, is subjected to direct causticizing by passing the slurry through line 9 to the causticizing unit 10. Only a very low content of non-alkaline soda is present in the sludge of this slurry and also in the liquor associated with the sludge. As a consequence, the non-caustic soda content of the slurry is substantially all in the form of the readily causticizable sodium carbonate with a minimum content of non-causticizable or difficultly causticizable non-alkaline soda compounds or sodium organates. This liquor is diluted by the addition of water as indicated at 11 to adjust the caustic soda concentration of the liquor in the causticizing unit to a low value which will permit approximately maximum efficiency of the causticizing reaction conducted therein, that is, not less than about 90% conversion of the sodium carbonate charged to the unit. The feed to the causticizing unit may be fortified by the addition of fresh soda ash as indicated at 12 in the flowsheet. The lime for causticizing is charged at 13 into the causticizing unit with 1.05 mols of lime being charged for each mol of sodium carbonate in the liquor to be causticized. The causticizing operation is conducted at a total soda concentration of about 150 g./l. at the atmospheric boiling point of the liquor and produces a causticizer effluent as indicated at 14 having a caustic soda concentration of 135 g./l. and a total soda concentration of 150 g./l. indicating that the causticizing unit operates at a conversion factor of at least 90% yielding a caustic to total soda ratio in the liquor of at least 0.9. The specific caustic soda to total soda ratio in the causticizer effluent liquor will vary somewhat depending upon the relative proportions of soda ash contributed by the centrifuge underflow slurry and by the fresh soda ash. For example, with 100% soda ash feed a C/S ratio of 0.95 is obtained, while with a 50% soda ash —50% centrifuge underflow feed to the causticizer of C/S ratio of 0.92 has been obtained.

The second fraction of separated precipitated sludge thickened to a 20% by weight solids content contains about 80% of the solids as a sodium carbonate with a high concentration of about 20% of its solids as non-alkaline soda, that is, sodium organates precipitated from the liquor by concentration. This fraction is passed through line 15 to a sinter operation 16 wherein it is mixed with bauxite ore in amount to give about 0.908 mol of alumina in the mixture per mol of soda in the sludge slurry from line 15. Also, lime is added in the amount of 2.1 mols per mol of silica in the ore charged to the sinter operation in order to minimize loss of alumina from the bauxite and from the sludge as insoluble sodium aluminum silicate. The sinter charge adjusted to the proper solids content is heated to a temperature approximating 1950° F. after which the sinter product is charged through line 17 to a leaching system. The sinter product is leached at 18 by the addition of causticizer effluent liquor through line 19 diluted at 20 with water. In the sintering operation substantially all of the non-caustic soda of the sludge is converted to sodium aluminate which is dissolved in the leaching system 18 by the diluted causticizer effluent liquor to produce a leaching effluent which is sodium aluminate enriched caustic liquor having an alumina to caustic soda ratio of about 0.60 and a caustic concentration of 170 g./l. The leaching system effluent is also fortified in caustic soda from the soda produced in the sintering operation in excess of the amount combined with the alumina of the ore. This liquor corresponding to Bayer process pregnant liquor may then be cycled to the main plant precipitators for recovery of the alumina after separation of the residues as in the clarification system indicated as 21 fed from the leach system through line 22, while the causticizer effluent is cycled to the mainline spent liquor system for blending with the high caustic soda concentration obtained from the centrifuge operation and the untreated spent liquor for recycling to the main plant digesters of the continuous Bayer process.

It is to be understood that the invention as applied to centrifugal classification is not limited to the fractionation of the precipitated sludge as indicated in the flowsheet. In certain instances, it may be much more desirable to charge all of the underflow from the centrifuging operation to the sintering operation 16 without cutting out any portion for direct causticizing in the causticizing unit 10, or it may be more desirable to causticize all of the solids obtained wherein the temperature conditions are such that substantially complete degradation to sodium carbonate takes place. In the latter instance, filtration is by far the preferred means of separating. Accordingly, it is to be understood that the invention embraces the concept of conducting the sintering and/or leaching operation on the total sludge obtained in the purification process.

Regardless of the alternative procedures employed, it may be stated that the present invention is advantageously suited to use in conjunction with the method providing for the recovery of substantially all of the soda present as non-caustic soda in the sludge separated from the concentrated liquor and in the liquor associated with the thickened sludge. In addition, by conducting the sinter operation on the sludge slurry, substantially all or a major portion of the alumina in the liquor of the slurry is recovered as sodium aluminate in the effluent from the leaching system.

The present invention, as above-described, has its most advantageous application in the production of alumina from aluminous ores containing at least a portion of the available alumina in monohydrate form, and particularly those ores characterized by a relatively large content of red mud residue difficult to settle, that is, those ores in the processing of which the liquor contamination becomes a vital factor. However, it is not intended to limit the invention to any particular type of aluminous ore, since the purification of any circulating caustic aluminate liquor by the process will produce beneficial results in terms of starch consumption, settling rate and alumina precipitation.

Various modifications or equivalent steps may be adopted without departing from the invention as defined by the scope of the appended claims. For example, any suitable means effective to separate the precipitated sludge from the concentrated liquor may be employed, the process not being limited to mechanical features such as centrifuging or filtration (except as to the specific embodiment involving fractional separation of the precipitated sludge). Moreover, the invention cannot be construed as limited to the treatment of the whole or any specific fraction of the circulating process liquor since this merely involves such factors as economics and capacity of equipment. In other words, starting with a previously contaminated liquor and without regard to economics or capacity limitations, the entire liquor stream may be purified in one operation to an acceptable settling rate with normal starch consumption considering the type of ore being processed. Alternatively on a more practical basis, a previously contaminated liquor may be gradually purified by subjecting a selected fraction thereof to the purification process per cycle of main Bayer process operations to establish a level of purity in regard to non-caustic soda permitting a desired minimum starch consumption at a practical and adequate red mud settling rate.

For maintaining an established level of purity, only a minor fraction of the liquor per Bayer process cycle need be treated. In actual commercial operation the size of the fraction treated may be determined on the basis of the amount of non-caustic soda to be rectified to caustic soda per cycle. In this regard, the amount of non-caustic soda separated and rectified will vary, depending upon the particular treatment i. e., the concentration of caustic soda in the evaporator, and whether process alternatives are employed, such as (1) a holding period for the liquor prior to sludge separation and (2) lime treatment.

Regarding concentration of the caustic soda, it is not intended to limit the invention in its generic aspect to any particular value, but it suffices to state that the liquor must be concentrated sufficiently to obtain the slimy gelatinous precipitate characteristic of the insoluble portion of the non-alkaline soda, a substantial portion of the sodium carbonate of the non-caustic soda inherently salting out at those caustic concentrations effective to precipitate the insoluble sodium organates of the non-alkaline fraction.

Accordingly, the invention is to be construed as to its true scope by the claims appended hereto.

What is claimed is:

1. In the production of alumina from aluminous ores by the wet alkali aluminate method, wherein solubilized organic compounds are introduced into the circulating caustic aluminate liquid from the ore and from the starch utilized as a flocculating agent for the insoluble ore residue settled from the caustic aluminate liquor, at least a portion of which organic compounds inhibit settling of the insoluble ore residue, the improvement of increasing the effectiveness of starch in flocculating the insoluble ore residue, which comprises concentrating the residue-free liquor to obtain a precipitated gelatinous sludge of organic compounds, heating the sludge-containing liquor at above atmospheric pressure to from about 150 to 250° C. without evaporation to further decontaminate the liquor in respect to settling inhibiting organic substances, and thereafter separating the precipitated sludge from the liquor.

2. In the production of alumina from aluminous ores by the wet alkali aluminate method wherein the process liquor contains sodium organic compounds and sodium carbonate and the digested ore residue is settled therefrom, the alumina is precipitated from the clarified liquor, and the spent liquor is recycled, and said organic compounds include substances which reduce the settling rate of said ore residue the process of purifying the circulating liquor which comprises concentrating a portion of the spent liquor to obtain a gelatinous slimy precipitate of the sodium organic compounds thereby also precipitating a substantial portion of the sodium carbonate, heating the gelatinous precipitate-containing liquor above the atmospheric boiling point thereof under pressures greater than atmospheric without evaporation, filtering the resulting sludge from the liquor, and returning the clarified concentrated liquor portion to the untreated spent liquor, the portion of said liquor concentrated being sufficient to substantially improve the settling rate of the ore residue and to control process carbonation.

3. In the wet alkali aluminate method of producing alumina from aluminous ores by continuous digestion in circulating caustic aluminate liquor wherein the insoluble red mud ore residues are settled from said liquor, and the liquor contains solubilized organic substances which act as settling inhibitors for the red mud residue of the ore and which reduce the yield of alumina from the liquor, the process of purifying the liquor of such settling inhibiting organic substances by degradation and removal, which comprises concentrating the liquor to obtain a precipitated sludge of a portion of the settling-inhibiting organic substances, heating the sludge-containing liquor above its atmospheric boiling point under pressures greater than atmospheric without evaporation for a time sufficient to further reduce the settling-inhibiting organic substance content in the liquor, and centrifuging the precipitated sludge from the liquor.

4. In the continuous production of alumina from aluminous ores by the wet alkali aluminate method, the process for treating the circulating caustic aluminate liquor to reduce the concentration of sodium organic compounds therein, which inhibit settling of the ore residues from the liquor, which comprises concentrating a minor fraction of the liquor to a caustic soda concentration of at least 350 grams per liter to precipitate a sludge of sodium organic compounds, heating the sludge-containing liquor at temperatures of from about 150° to 250° C. under pressures greater than atmospheric, separating the sludge from the liquor, and returning the clarified concentrated liquor fraction to the main body of circulating liquor.

5. A process according to claim 4 in which the separated sludge slurry is mixed with alumina-containing material, the mixture is sintered, and the sintered product is leached with dilute caustic soda solution to produce a caustic soda fortified sodium aluminate solution thereby substantially completely recovering the soda in the sludge and the soda and alumina in the slurry liquor.

6. A process according to claim 4 in which the sludge is fractionated during separation from the liquor by centrifuging into a high solids sodium carbonate rich fraction and a low solids sodium organic compound rich fraction, the soda of the sodium carbonate fraction being rectified to caustic soda by direct lime causticizing and the other fraction being mixed with alumina-containing material sintered and leached with dilute caustic soda liquor to recover substantially all of the organic compound soda as sodium aluminate, and returning the lime-causticized caustic soda and the recovered sodium aluminate to the circulating caustic aluminate liquor.

7. A process according to claim 4 in which the sludge is causticized with lime to rectify the sodium carbonate to caustic soda.

8. In the production of alumina from aluminous materials wherein said materials are digested in circulating caustic aluminate liquor, the insoluble residues are settled from the digestion liquor, and sodium organic compounds accumulate in the circulating liquor and inhibit settling of the insoluble ore residues, the process of reducing the concentration of the settling-inhibiting sodium organic compounds in the liquor, which comprises concentrating the residue-free liquor to obtain a gelatinous slimy precipitate of a substantial portion of said sodium organic compounds, heating the precipitate-containing liquor without evaporation above the atmospheric boiling point thereof under pressures greater than atmospheric, and separating the precipitate from the heat-treated liquor.

References Cited in the file of this patent

UNITED STATES PATENTS

| | | |
|---|---|---|
| 1,747,759 | Dorr | Feb. 18, 1930 |
| 2,056,993 | Weigel | Oct. 13, 1936 |
| 2,280,998 | Brown | Apr. 28, 1942 |
| 2,375,343 | Brown | May 8, 1945 |
| 2,440,378 | Newsome | Apr. 27, 1948 |
| 2,463,207 | Kerr | Apr. 26, 1949 |
| 2,519,362 | Flint et al. | Aug. 22, 1950 |
| 2,522,605 | Cundiff | Sept. 19, 1950 |
| 2,557,629 | Boivent | June 19, 1951 |

OTHER REFERENCES

Sherwin: "Extractive Metallurgy of Aluminum" in "Journal of Metals," April 1950, pages 661 to 667 inclusive.

UNITED STATES PATENT OFFICE

CERTIFICATE OF CORRECTION

Patent No. 2,806,766                      September 17, 1957

Arvid A. Anderson

It is hereby certified that error appears in the printed specification of the above numbered patent requiring correction and that the said Letters Patent should read as corrected below.

Column 2, line 17, for "its comprises" read -- it comprises --; column 11, line 67, for "slury" read -- slurry --; column 13, line 2, before "obtained" insert -- liquor --.

Signed and sealed this 17th day of November 1959.

(SEAL)
Attest:

KARL H. AXLINE                      ROBERT C. WATSON
Attesting Officer                    Commissioner of Patents